United States Patent
Finkenzeller

(10) Patent No.: US 7,808,389 B2
(45) Date of Patent: Oct. 5, 2010

(54) DATA TRANSMISSION METHOD AND A RFID READER PROVIDED WITH A COIL AND A CONTROL CIRCUIT FOR FIELD QUENCHING OUTSIDE OF A COMMUNICATION AREA

(75) Inventor: Klaus Finkenzeller, Unterföhring (DE)

(73) Assignee: Giesecke & Devrient GmbH, Munich (DE)

( * ) Notice: Subject to any disclaimer, the term of this patent is extended or adjusted under 35 U.S.C. 154(b) by 329 days.

(21) Appl. No.: 11/886,426

(22) PCT Filed: Mar. 13, 2006

(86) PCT No.: PCT/EP2006/002278

§ 371 (c)(1),
(2), (4) Date: Feb. 15, 2008

(87) PCT Pub. No.: WO2006/097259

PCT Pub. Date: Sep. 21, 2006

(65) Prior Publication Data

US 2008/0136595 A1 Jun. 12, 2008

(30) Foreign Application Priority Data

Mar. 14, 2005 (DE) ...................... 10 2005 011 611

(51) Int. Cl.
*G08B 13/14* (2006.01)
(52) U.S. Cl. ............. 340/572.4; 340/572.7; 340/539.21
(58) Field of Classification Search ............... 340/572.1, 340/572.4, 572.7, 572.8, 539.1, 539.11, 539.21, 340/5.86, 10.1, 10.2; 235/380, 381; 343/787, 343/788
See application file for complete search history.

(56) References Cited

U.S. PATENT DOCUMENTS

| 6,208,235 | B1 * | 3/2001 | Trontelj ..................... 340/10.1 |
| 6,337,634 | B1 * | 1/2002 | O'Toole et al. ........ 340/825.56 |
| 6,429,768 | B1 | 8/2002 | Flick |
| 7,019,651 | B2 * | 3/2006 | Hall et al. ................ 340/572.7 |

(Continued)

FOREIGN PATENT DOCUMENTS

DE     197 15 215 C 1     10/1998

(Continued)

OTHER PUBLICATIONS

Search Report German Patent Office (Mar. 14, 2005).

(Continued)

*Primary Examiner*—Van T. Trieu
(74) *Attorney, Agent, or Firm*—Bacon & Thomas, PLLC

(57) ABSTRACT

The present invention relates to a method, a reading device and a system for transmitting data and/or energy between a reading device and a transponder unit. Via a first antenna coil of the reading device generating a first magnetic field data and/or energy are transmitted to the transponder unit. By means of a second antenna coil a second magnetic field with opposite sign is generated. Within a near field or communication range (12) of the reading device the second magnetic field is weaker than the first magnetic field. In a tap-proof range (13), i.e. outside the near field, the two magnetic fields have the same absolute value and cancel each other out due to the opposite signs.

24 Claims, 2 Drawing Sheets

Figure 1:
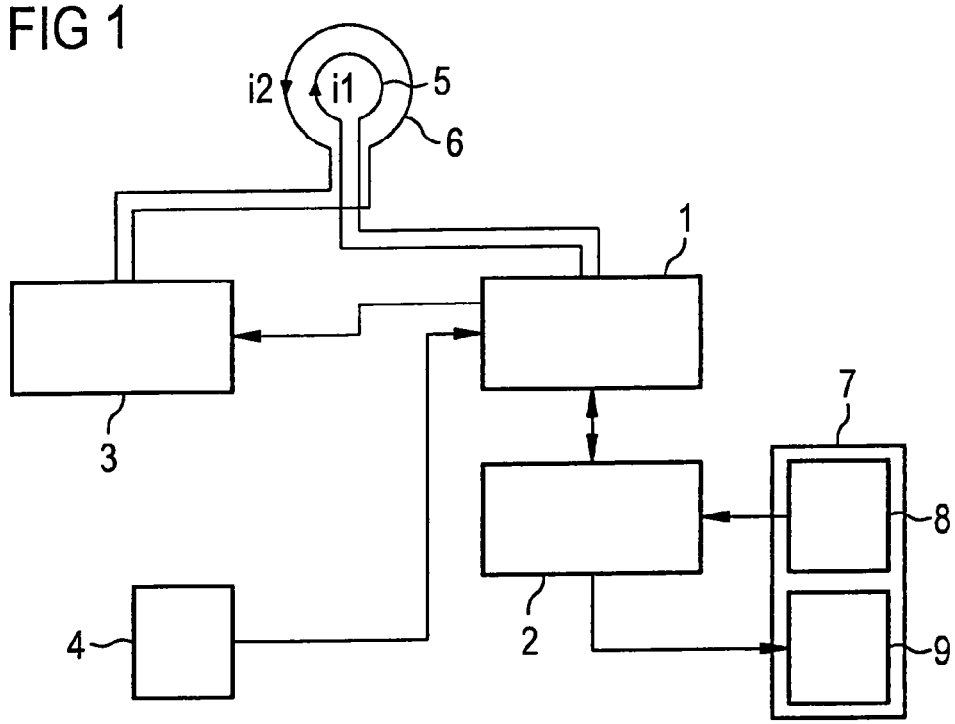

U.S. PATENT DOCUMENTS 7,591,415 B2 * 9/2009 Jesme .................. 235/380
2005/0033544 A1 * 2/2005 Brooks et al. ............. 702/128

FOREIGN PATENT DOCUMENTS

| | | |
|---|---|---|
| DE | 197 26 335 C2 | 12/1998 |
| DE | 197 27 930 A1 | 1/1999 |
| DE | 198 35 155 A1 | 2/2000 |
| EP | 0 833 169 A1 | 4/1998 |
| EP | 0 886 232 A2 | 12/1998 |
| EP | 1 494 311 A1 | 1/2005 |
| WO | WO 98/47094 | 10/1998 |
| WO | WO 99/43096 | 8/1999 |

OTHER PUBLICATIONS

International Search report PCT/EP 2006/002278 (Jun. 29, 2006).

* cited by examiner

—— H(x)
---- $H_L(x, I_1, r1)$

DATA TRANSMISSION METHOD AND A RFID READER PROVIDED WITH A COIL AND A CONTROL CIRCUIT FOR FIELD QUENCHING OUTSIDE OF A COMMUNICATION AREA

The present invention relates to a reading device serving for transmitting data and/or energy between the reading device and a transponder unit. Furthermore, the invention relates to a method and a system for transmitting data and/or energy between the reading device and the transponder unit.

In connection with the present invention an arrangement of an antenna and an electronic circuit is to be understood as transponder unit, wherein the antenna is embodied in the form of an antenna coil and the circuit can be embodied in the form of a chip. Transponder units of this type are used in contactless chip cards, in labels placed on goods, in keys, particularly car keys, as immobilizer system, but also in animals for identification purposes.

In order to read out data from a transponder unit in a contactless manner and/or to send data to a transponder unit, reading devices are used, whose structure is known in principle. Additionally, such reading devices can supply the transponder unit with energy in a contactless manner over a certain distance, so that the transponder unit does not require an energy supply of its own. Such contactless data- and energy transmission systems are conventionally called RFID (radio frequency identification) systems. They have a specific power range and a specific response range.

The power range designates the distance of the transponder unit to the reading device at which only just sufficient energy is supplied by the reading device for the operation of the transponder unit. The maximum response range defines the range within which data can only just be exchanged between the reading device and the transponder. Therein, the power range is smaller than the maximum response range. For this reason, at a greater distance, data sent by the reading device can only be detected by the transponder unit provided that the transponder unit has its own energy supply, for example in the form of a battery. Such transponder units are referred to as active transponders, the others as passive transponders.

A conventional RFID reading device emits a high frequency magnetic field of e.g. 13.56 MHz via an antenna coil, wherein passive transponder units within the power range of the reading device draw energy from this magnetic field through reverse coupling between the antenna coil of the reading device and the antenna coil of the transponder unit. Therein the electrical power available to the transponder unit is proportional to the magnetic field strength on the antenna coil of the transponder unit. Typical power ranges of such systems are approximately 10 cm for ISO 14443 and up to 1 m for ISO 15693 compatible systems. The data transmission from the reading device to the transponder can for example be carried out by modulation of the field generated by the reading device. The method which is used by far most frequently for data transmission from the transponder unit to the reading device is the so-called load modulation. A variety of modulation types and their technical implementation are described in the "RFID Handbuch" by Klaus Finkenzeller (ISBN 3-446-22071-2).

Since the data transmitted between the reading device and the transponder unit can still be detected also at greater distances, they can be tapped and demodulated relatively easily by means of a conventional short wave receiver, thereby rendering an attack on an RFID system possible. For example it is possible in ISO 14443 to determine the unique serial number of a transponder unit involved in the data transmission merely by tapping the data sent from the reading device to the transponder unit. Likewise, binary application data can be read, insofar as they are not transmitted in an encrypted state.

Moreover, if it is possible to send back data to a reading device from a great distance, it can also be attempted from a great distance, e.g. of several meters, to communicate with the reading device and to attack an RFID system.

The document U.S. Pat. No. 6,429,768 B1 describes a security system for vehicles. The vehicle key, which is equipped with a passive transponder, is part of the system. If the transponder is within the power range and the response range of a reading device of the vehicle, which is adapted to exclusively receiving data from the transponder here, a unidirectional data transmission takes place form the transponder to the reading device. If the transponder is identified by the reading device as a valid transponder, the vehicle can be started. The data transmission can be prevented by a jamming transmitter disposed inside the vehicle, wherein the jamming transmitter emits a jamming signal only if it is activated by an alarm control of the vehicle. The problem here is that the data transmission from the transponder to the reading device using a conventional RFID reading device can be "eavesdropped" throughout the response range, hence also outside the power range of the reading device, so that for example car thieves do not encounter any problem in obtaining the transponder-specific data which are crucial for starting the vehicle.

In contrast, the document EP 0 833 169 A1 describes a method for blocking undesired responses by a "false" transponder disposed within the response range of a reading device. This method is described in connection with an automatic identification of vehicles on toll roads, wherein only one respective vehicle is to be checked by means of a transponder before being allowed to pass a barrier. The transponder is recognized as valid on condition that the toll has been paid. It is the object of the reading device to activate the transponder, query the transponder, and to send a confirmation signal to the transponder upon receipt of a valid response. Therein the transponder calculates a checksum on the basis of the query signal of the reading device and sends a response to the reading device only provided that the checksum is valid. In some parts of the response range of the reading device at least one jamming transmitter locally separated from the reading device is arranged, which emits a signal that is very strong in comparison to that of the reading device, in order to prompt all "false" transponders in this partial range to calculate an incorrect checksum and consequently not to send a response. The implementation of such a system is very elaborate, since a jamming transmitter locally separated from the reading device has to be arranged in each part of the reading device's response range in which any communication with "false" transponders is to be rendered impossible.

It is therefore the object of the invention to protect an RFID system against attacks in a simple manner, and to substantially prevent the tapping of a data transmission between a reading device and a transponder unit.

This object is solved by a method, a reading device and a system in accordance with the independent claims. In claims dependent on these, advantageous embodiments and developments of the invention are specified.

The inventive reading device has two antenna coils for generating a first and a second magnetic field, wherein the magnetic fields are adapted by means of a control circuit of the reading device in such a way that outside a near field of the reading device they have the same absolute value and opposite signs. Thereby the first and the second magnetic field cancel each other out outside the near field of the reading device. However, within the near field the reading device can communicate with transponders via the antenna coil generating the stronger magnetic field in the near field. Therein this antenna coil serves to supply the transponder unit with power when communication takes place with passive transponders, and/or to transmit data between the reading device and the transponder unit.

An advantage of the invention is to be seen in the fact that in connection with an inventive RFID system no adaptations of the transponders are necessary at all. Within the near field of the reading device conventional transponders can be read without any problem. Outside the near field, thus in the range of cancellation of fields, a communication cannot be tapped. In connection with the invention the near field is also referred to as communication range, since outside this range no data communication can take place between the reading device and transponders, or passive transponders cannot be supplied with energy.

In order to generate the two magnetic fields, the antenna coils are both supplied with a defined current. The strength of the magnetic field decreases at a growing distance (x) from the coil, wherein the field strength remains almost constant up to a distance depending on the coil radius (r) and drops greatly thereafter. The greater the current flowing through the respective antenna coil, the greater is also the field strength of the generated alternating magnetic field. Thereby the response range and the power range of any coil can be extended or reduced. It is known that the distribution of the field strengths of two antenna coils at the same current flow-through is different, if the antenna coils have different coil diameters (r), the conductor loops thus enclose different surfaces. The smaller the radius of the coil, the greater the field strength is in the proximity of the coil, however the sooner the field strength decreases at a growing distance.

The two antenna coils of the reading device consequently preferably have different coil diameters. According to the invention the antenna coils are supplied with currents pointing in different directions, in order to generate two contrary magnetic fields. The inventive reading device is adapted to generate the two magnetic fields simultaneously, and the first magnetic field of the first antenna coil in the near field of the reading device is greater than the second magnetic field of the second antenna coil, so that the two magnetic fields have approximately the same field strength only at a certain distance from the reading device. Viewed in a diagram, in which the field strength is shown in relation to the distance (x) from the reading device, the curves of the two field strengths approximately coincide starting at this distance. By changing the coil diameters the reading device can be adapted to different communication ranges.

Whereas the first magnetic field generated by the small antenna coil serves for communication, thus for the transmission of data and/or energy, between the reading device and the transponder, the second magnetic field generated by the large coil is preferably used exclusively to achieve a field cancellation of the two magnetic fields outside the near field of the reading device. Since the field strength of the first magnetic field in the communication range is greater than the field strength of the second magnetic field, the reading device can communicate with the at least one transponder unit via the first antenna coil in the communication range, despite the second magnetic field generated by the second antenna coil. For this purpose the diameters of the two antenna coils are designed in such a way that in the communication range of the reading device the field strength of the first, smaller antenna coil is substantially greater than the field strength of the second, larger antenna coil. If the transponder unit is moved outside the communication range, communication is no longer possible, since in this remote field the second magnetic field has the same absolute value and an opposite sign, whereby the magnetic fields cancel each other out. A tapping of the communication between reading device and transponder unit from greater distances is prevented, since no magnetic field is detectable any longer outside the communication range of the reading device. This remote field can therefore also be referred to as tap-proof range.

However, the following interaction has to be taken into account. If a transponder is brought into the communication range, i.e. the near field, of the reading device, an impedance is transformed in the antenna coils of the reading device through the magnetic contrary inductance between the antennas of the reading device and the introduced transponder. The value of the impedance coupled in is dependent on the quality of the transponder, the power input of the transponder and the coupling factor between the coils, thus on the distance and the antenna size of the transponder. Thereby a coordinated relationship between the currents for the two antenna coils of the reading device is unbalanced, whereby the cancellation of fields outside the near field is no longer secured, since an imbalance of the relationship between the currents leads to a more or less strong field strength in the range actually meant to be tap-proof. Consequently, a communication between transponder and reading device can possibly be tapped also outside the actual communication range.

According to a first variant the control circuit of the reading device comprises a current-controlled current source, which is referred to as current mirror if a reversal of sign of the output current takes place. The current mirror is a circuit whose output current (ideally) has the same characteristic as the input current. However, the amplitude generally is higher or lower. In the present invention the current mirror is used to derive the current for the second, larger antenna coil from the current for the first, smaller antenna coil. Therein the current for the second antenna coil is adapted in such a way that it generates a magnetic field with opposite sign in the second antenna coil, which magnetic field has the same field strength as the first magnetic field outside the communication range of the reading device. The current for the first antenna coil consequently is the current supplied by the reading device and serves as reference current. The advantage of the current mirror is that the current for the second antenna coil can be derived exactly from the current for the first antenna coil, in order to achieve a reliable cancellation of fields outside the communication range of the reading device.

According to a second variant the magnetic field strength detectable outside the communication range serves as input value for the control circuit. For even small deviations in phase or amplitude of the current of one of the two coils from the optimum value lead to a significant increase of the measurable field strength in the range $x \gg r$, whereby a tapping of the communication between the reading device and the transponder is possible. Therefore according to the second variant the field strength in the range $x \gg r$ is detected, for example by means of a third conductor loop in the reading device. On the basis of the measured value the first and the second magnetic field, or the ratio of the currents $i2/i1$, can be adapted by means of the control circuit, in order to approximately achieve a field cancellation in the tap-proof range, so that the magnetic field strength measured at the distance $x \gg r$ reaches a minimum value.

If the reading device is to communicate with passive transponders, the field strength of the first, smaller antenna coil has to be sufficiently high, so that the transponder unit is supplied with sufficient energy. Correspondingly, the coil diameter of the first antenna coil should be chosen to be relatively small. However, in RFID systems the energy supply of passive transponders is only possible at a small distance (approx. 10 cm) between the reading device and the transponder unit. Since the field strength of a small coil decreases comparatively soon at a growing distance, the response range of the reading device is relatively small.

However, if the data transmission takes place between the inventive reading device and an active transponder, the power range of the reading device no longer has to be considered in the adaptation of the reading device. Rather, the communication range of the reading device can be chosen to be correspondingly greater, by choosing a correspondingly large diameter of the first, smaller coil. Correspondingly, in this case the useful signal is still detectable at a relatively great distance from the active transponder. It is also advantageous in this case if the difference between the two coil radii of the small and the large antenna coil is great. Consequently the useful signal is particularly easily detectable in the communication range, since the field strength of the second magnetic field is comparatively low. In contrast, the absolute value of the first and the second field strength in the tap-proof range is equal, so that the magnetic fields cancel each other out provided that they are oriented contrarily.

Figure 2:
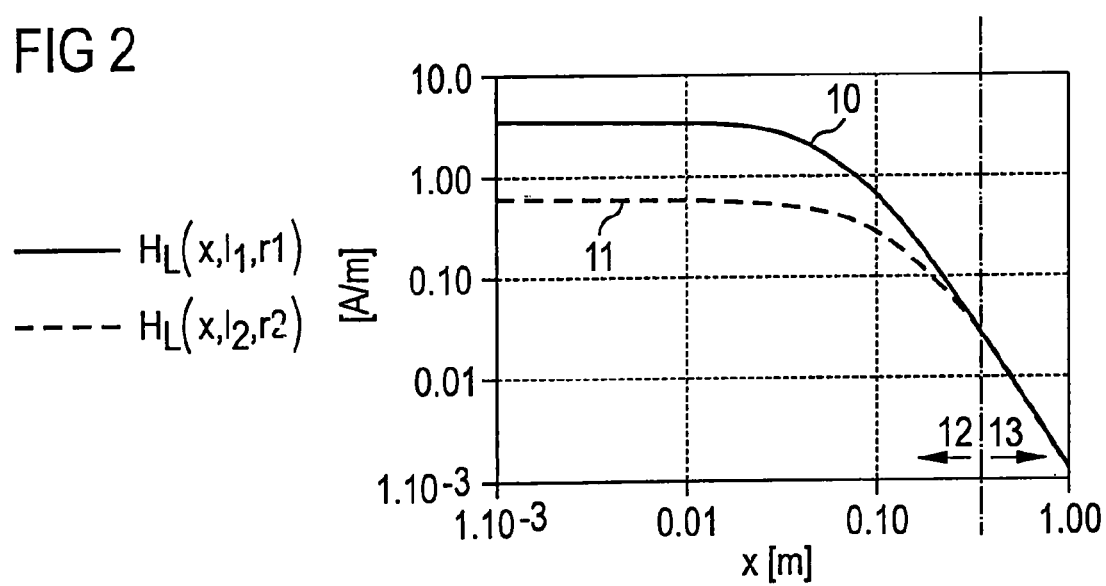
Figure 3:
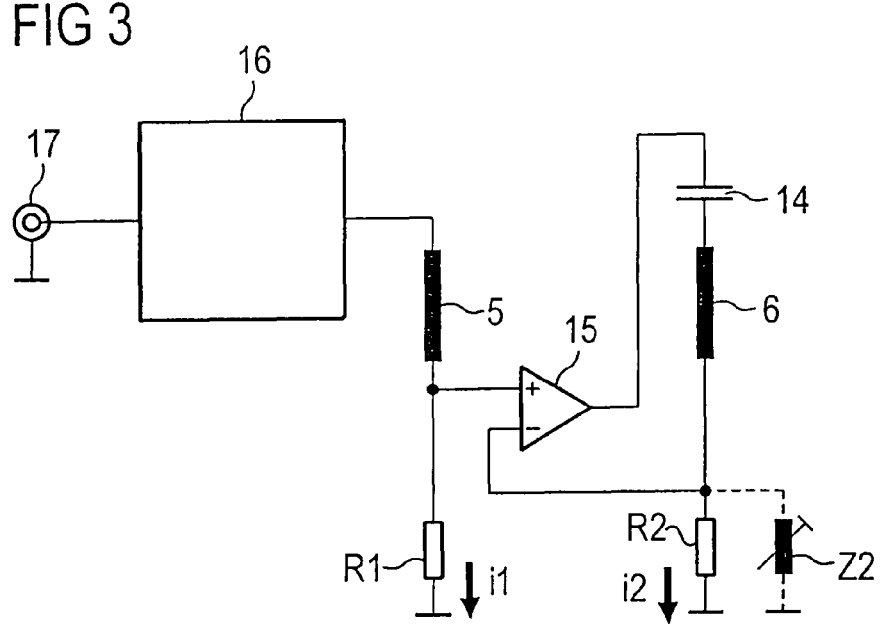

Further characteristics and advantages of the invention will result from the following description of a variety of exemplary embodiments and alternative embodiments according to the invention in connection with the accompanying drawings. The figures are described as follows:

FIG. 1 schematic structure of an inventive reading device;

FIG. 2 the progression of the field strength in the vicinity of two antenna coils with different coil diameters and inventively adapted currents in the coils;

FIG. 3 a current mirror for use in the inventive reading device; and

Figure 4:
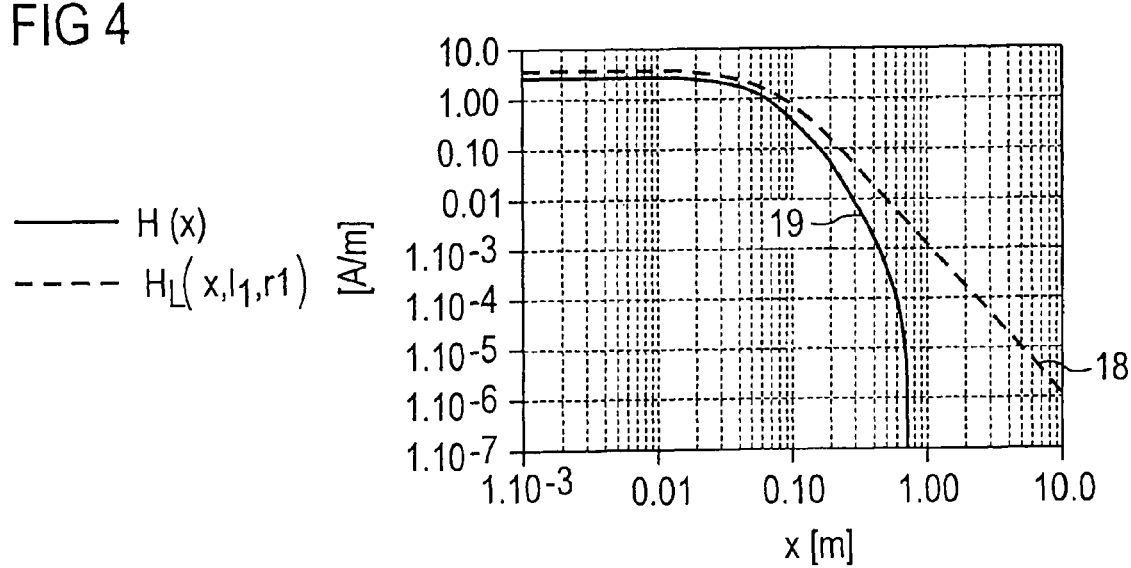

FIG. 4 a comparison between the distribution of the field strength of a conventional reading device and that of an inventive reading device.

FIG. 1 shows the schematic structure of an inventive reading device. In principle the reading device comprises a first transmitter 1, which is simultaneously a receiver, a modulator/demodulator 2, a second transmitter 3 and an oscillator 4 for generating a transmission frequency of the two transmitters 1, 3. The first transmitter 1 is connected with a first transmitting antenna 5 and the second transmitter 3 is connected with a second transmitting antenna 6. Therein the radius of the first transmitting antenna 5 is chosen to be smaller than the radius of the second transmitting antenna 6. The current i1 flows through the first transmitting antenna 5, and the current i2 flows through the second transmitting antenna 6, in order to generate respective magnetic fields with a corresponding field strength on the transmitting antennas 5, 6, which are embodied as conductor loops. The second transmitter 3 supplies the second conductor loop 6 with the current i2, which is proportionate to the current i1 in the first conductor loop 5: i1=Vi*i2. The direction of the currents i2 is chosen in such a way that the generated magnetic fields point in different directions.

The conductor loops 5, 6 are preferably arranged in a common plane. Furthermore, the two conductor loops 5, 6, as shown in FIG. 1, are preferably arranged coaxially. In this arrangement of the conductor loops 5, 6 their magnetic fields and response ranges can be coordinated exactly.

Furthermore, the reading device has a control 7, e.g. a programmable microprocessor. In the transmission mode of the reading device data 8 to be transmitted to a transponder unit (not shown) are passed on to the first modulator/demodulator 2 by means of the control 7, in order to modulate a carrier signal of the reading device accordingly. In the receiving mode of the reading device data 9 received from the transponder unit are demodulated by the modulator/demodulator 2 and passed on to the control 7.

The first transmitter 1 with the first modulator/demodulator 2 is structured conventionally. Thereby communication with a transponder unit in the response range of the reading device can take place in both directions, thus data can be sent to the transponder or can be received from the transponder. The second transmitter 3 is not intended for receiving data. The second transmitter 3 is ideally implemented by a current mirror, but also other circuits are thinkable.

FIG. 2 shows the progression of the magnetic field strength H(x, I, r) of the two conductor loops 5, 6 with different radii r1 and r2 at a distance x, wherein different currents i1, i2 flow through the conductor loops 5, 6. The field strengths 10 (small conductor loop 5), 11 (large conductor loop 6) of the two magnetic fields take an almost constant course up to a certain distance x depending on the coil radius, but then drop. This means that there is an optimum antenna radius r for every desired reading range of an RFID system. Therein the currents are adapted in such a way that at a small distance x to the antenna the smaller conductor loop 5 with the radius r1 has a substantially stronger magnetic field H than the larger conductor loop 6 with the radius r2. Approximately at a distance x=r1 the field strength H of the conductor loop 5 starts decreasing at a rate of 60 dB/decade. Likewise, the field strength of the conductor loop 6 decreases continuously at a rate of 60 db/decade starting at a certain distance.

The radii r1, r2 of the two conductor loops 5, 6 as well as the transmit power of the first transmitter 1 and of the second transmitter 3 are designed in such a way that within a communication range 12 the data-containing first magnetic field of the conductor loop 5 is substantially stronger than the second magnetic field of the conductor loop 6. According to the invention the field strength H(x, I, r) generated by the conductor loops 5, 6 is adapted in such a way that the two field strengths 10, 11 reach the same absolute value in the range of the field decreasing at a rate of 60 dB/decade, thus outside the communication range 12. Through a simultaneous, inversely phased emission of the fields a cancellation is achieved in this range (H1=H2). Therefore this range outside the communication range 12 can be referred to as tap-proof range 13, since no field strengths are detectable in this range.

The measurement shown in FIG. 2 was carried out with the following values:

Conductor loop 5: i1=0.5 A; r1=0.07 cm
Conductor loop 6: i2=0.15 A, r2=0.13 cm

The field strength of a conductor loop in the near field is calculated as follows:

$$H(x, r) = \frac{I \cdot r^2 \cdot N}{2\sqrt{(x^2 + r^2)^3}} \quad [1]$$

N: number of windings of the conductor loop

The following correlation can be determined for the adjustment of the currents i1, i2 of the conductor loops 5, 6 if the magnetic fields are to be canceled out at the distance x, thus are to have the same absolute value:

$$\frac{I_1}{I_2} = \frac{V^2 \cdot \sqrt{(x^2 + r_1^2)^3}}{\sqrt{(x^2 + r_1^2 \cdot V^2)^3}} \quad [2]$$

V: ratio of the coil radii (V=r2/r1); N=1

In the distance range of the field decreasing at a rate of 60 dB/decade, which is interesting for the inventive arrangement, i.e. x>>r, the current ratio i1/i2 approaches the value V2:

$$\frac{I_1}{I_2} = V^2 = \left(\frac{r_2}{r_1}\right)^2 \text{ for } x \gg r1 \quad [3]$$

In order to make sure that the fields are canceled out outside the communication range 12 of the reading device, according to the invention it is provided to correlate the currents i1, i2 in the two conductor loops 5, 6 regarding their value and phase by means of a current mirror. A circuit arrangement adapted to the inventive reading device is shown in FIG. 3.

FIG. 3 shows a first conductor loop 5 and a second conductor loop 6. Via two attenuating resistors R1, R2, which are respectively arranged between the two conductor loops 5, 6 and ground, a first current i1 and a second current i2 flow respectively. A first input of a differential amplifier 15 is connected to the connection line between the first conductor loop 5 and the first resistor R1. Analogously a second input of the differential amplifier 15 is connected to the connection line between the second conductor loop 6 and the second resistor R2. The output of the differential amplifier 15 is connected to the second conductor loop 6 via a capacitor 14. Furthermore the first conductor loop 5 is connected to a signal-transmitting coaxial cable 17 via an adaptation network 16 adapting the impedance.

As resistor R1 an attenuation resistor is used, which is usually connected in series with the conductor loop 5. For the currents i1, i2 in the inventive arrangement consequently the following correlation results:

$$\frac{I_1}{I_2} = V^2 = \frac{R_2}{R_1} \quad [4]$$

Together with the conductor loop 6 the capacitor 14 forms an oscillating circuit on the transmission frequency of the reading device, for example 13.56 MHz. A differential amplifier 15 is operated on a symmetrical supply voltage (+Vcc, −Vcc), so that also the output signal can be a sinus signal symmetric to the zero point. Furthermore, the differential amplifier 15 is embodied as a power amplifier, in order to supply the required current i2 for the second conductor loop 6. Optionally an adjustable impedance Z2 can be provided parallel to the resistor R2, in order to correct systematic errors of the current i2 in value and/or phase.

It can furthermore be provided optionally to design the resistor R2 and/or the impedance Z2 controllably. As control signal for their control a magnetic field strength detected outside the communication range (x>>r) can be used. Thus the (remaining) field strength detected in this range (x>>r) can be adjusted to a minimum. The control circuit 3 can also receive a control signal from a detector which is arranged outside the desired communication range. The detector comprises at least one magnetic field sensor, for example in the form of a conductor loop or antenna, and a circuit for converting the sensor signal into the control signal, for example in the form of a receiver.

In the HF range switching on an antenna in the reading device can cause undesirable effects such as power reflections, impedance transformation and parasitic power irradiation. In order to prevent this, in RFID systems plugs and cables are used which are uniformly designed for a conductor impedance of 50 Ohm and which are correspondingly inexpensive as mass products. The conductor loop 5 represents an impedance in the operating frequency range of the RFID system. Therefore the conductor loop 5 is connected for example to an adaptation network 16 for the purpose of power adaptation to a 50 Ohm system, the adaptation network transforming the impedance of the conductor loop 1 to a value of 50 Ohm real. The energy transmission from a reader output stage (not shown) can for example be carried out by the coaxial cable 17 (almost) free of losses and undesirable irradiation.

FIG. 4 shows a comparison between the distribution of the field strength 18 of a conventional reading device and the distribution of the field strength 19 of an inventive reading device. It can be inferred from FIG. 4 that already at a distance of approx. 75 cm to the reading device the signal of the reading device is so weak that even the tapping of the signal from the reading device to the transponder is impossible.

The invention claimed is:

1. Method for transmitting data and/or energy between a reading device and a transponder unit, comprising the steps of:
   generating a magnetic field by means of a first antenna coil of a reading device, said first antenna coil being supplied with a first current;
   generating a second magnetic field by means of a second antenna coil supplied with a second current such that when a transponder unit is brought within a communication range of said reading device, current imbalances caused by impedances are induced between said first and second antenna coils; and
   deriving the second current from the first current by using a current mirror to prevent said current imbalances caused by impedances induced in said coils when said transponder unit is brought within said communication range of said reading device,
   said second magnetic field being generated by the second antenna coil so that in a near field of the reading device its absolute value is smaller than that of the first magnetic field and outside the near field has approximately the same absolute value with opposite sign to cause said magnetic fields to cancel outside said near field and thereby prevent tapping of a communication between said reading device and said transponder from outside of said communication range.

2. Method according to claim 1, including locating the center axis of the first antenna coil within the second antenna coil.

3. Method according to claim 1, including supplying the two antenna coils with currents, through which the magnetic fields resulting therefrom point in opposite directions.

4. Method according to claim 1, including supplying the two antenna coils with opposite-phase currents.

5. Method according to claim 1, including supplying the two antenna coils with currents whose amplitudes are proportional to each other.

6. Method according to claim 1, wherein the current controlling step comprises the step of correlating the currents in the two antenna coils to each other with respect to value and phase.

7. Method according to claim 1, further comprising the step of detecting a magnetic field strength outside the near field, and wherein the current controlling step comprises the step of controlling said currents to adapt the magnetic field of at least one of the first and the second antenna coil in such a way that the detected magnetic field strength reaches a minimum value.

8. Method according to claim 1, wherein in the first antenna coil and the second antenna coil high-frequency magnetic fields having the same frequency are generated.

9. Method according to claim 1, wherein by means of the first magnetic field a useful signal containing data is at least one of sent to the transponder unit and received from the transponder unit.

10. Method according to claim 1, including adapting the field strengths of the two magnetic fields by changing the respective coil diameters, in order to define the near field of the reading device.

11. Reading device for transmitting data and/or energy between a reading device and at least one transponder unit, the reading device comprising one first antenna coil adapted to generate a first magnetic field, the first antenna coil being supplied with a first current, a second antenna coil adapted to generate a second magnetic field, the second antenna coil being supplied with a second current such that when a transponder unit is brought within a communication range of said reading device, current imbalances caused by impedances are induced between said first and second antenna said coils, and a control circuit for the first and the second magnetic field, wherein the control circuit is adapted to control currents in at least one of said first and second antenna coils by deriving the second current from the first current by means of a current mirror to prevent said current imbalances caused by impedances induced in said coils when said transponder unit is brought within said communication range of said reading device, so as to adjust the first and second magnetic fields in such a way that outside a near field of the reading device the second magnetic field has approximately the same absolute value and an opposite sign as the first magnetic field, and in the near field is weaker than the first magnetic field and thereby prevent tapping of a communication between said reading device and said transponder from outside of said communication range.

12. Reading device according to claim 11, wherein the reading device is adapted to supply the antenna coils with currents, through which the resulting magnetic fields point in opposite directions.

13. Reading device according to claim 11, wherein the control circuit is adapted to control the currents for the antenna coils in order to adjust the magnetic fields.

14. Reading device according to claim 11, wherein the second antenna coil forms a serial resonant circuit with a serially connected capacitor, the resonance frequency of the serial resonant circuit corresponding to the transmission frequency of the reading device.

15. Reading device according to claim 11, including a resistor and/or an impedance, arranged between ground and the second antenna, and which resistor and impedance are controllable; a field strength detector arranged to detect a field strength outside the near field and to output a field strength signal; said field strength signal serving as input value for controlling said resistor and impendence.

16. Reading device according to claim 11, including a device for evaluating a magnetic field strength outside the near field, wherein the control circuit is adapted to adjust the magnetic fields depending on the detected magnetic field strength in such a way that the magnetic field strength reaches a minimum value.

17. Reading device according to claim 16, wherein the device for evaluating the magnetic field strength outside the near field comprises a third antenna coil and a circuit for determining a magnetic field strength measured by the third antenna coil.

18. Reading device according to claim 11, wherein the second antenna coil has a diameter which is larger in comparison to that of the first antenna coil.

19. Reading device according to claim 11, wherein the first and the second antenna coil are arranged in one common plane.

20. Reading device according to claim 11, wherein the two antenna coils are arranged coaxially.

21. Reading device according to claim 11, wherein the reading device is adapted to at least one of sending to and receiving from the at least one transponder unit via the first antenna coil a useful signal containing data.

22. System for transmitting data and/or energy between a transponder unit and a reading device according to claim 11.

23. Method according to claim 11, further comprising the steps of:
using said current mirror to compare said first current at a connection between a first attenuation resistor and said first antenna coil with said second current at a connection between said second attenuation resistor and said second antenna coils; and
causing said second current to oscillate on a transmission frequency of the reading device.

24. Reading device according to claim 11, wherein said current mirror comprises:
current comparing means for comparing currents; a first attenuation resistor connected to said first antenna coil and to a first input of said current comparing means; and
a second attenuation resistor connected to a first end of the second antenna coils and to a second input of said current comparing means; and
further comprising oscillating means connected to an output of said current comparing means for forming, with said second antenna coil, an oscillating circuit on a transmission frequency of the reading device.

* * * * *